(12) United States Patent
Van Wert

(10) Patent No.: US 12,696,877 B2
(45) Date of Patent: Aug. 4, 2026

(54) DYNAMIC PET TREAT SYSTEM

(71) Applicant: Carrie Van Wert, Eden Prairie, MN (US)

(72) Inventor: Carrie Van Wert, Eden Prairie, MN (US)

( * ) Notice: Subject to any disclaimer, the term of this patent is extended or adjusted under 35 U.S.C. 154(b) by 0 days.

(21) Appl. No.: 18/803,124

(22) Filed: Aug. 13, 2024

(65) Prior Publication Data

US 2025/0064021 A1 Feb. 27, 2025

Related U.S. Application Data

(60) Provisional application No. 63/534,654, filed on Aug. 25, 2023.

(51) Int. Cl.
*A01K 15/02* (2006.01)

(52) U.S. Cl.
CPC .................................. *A01K 15/025* (2013.01)

(58) Field of Classification Search
CPC ............................ A01K 5/0201; A01K 5/0114
See application file for complete search history.

(56) References Cited

U.S. PATENT DOCUMENTS 2,096,078 A * 10/1937 Windson .............. A01K 15/025 119/708
2,194,736 A * 3/1940 De Bruler ............ A01K 15/025 119/711
D133,869 S 9/1942 Donahue
2,698,598 A * 1/1955 Hadley ................ A01K 15/025 248/104
4,251,071 A 2/1981 Norton
4,517,922 A * 5/1985 Lind .................... A01K 15/025 119/708
5,092,272 A 3/1992 O'Rourke
(Continued)

FOREIGN PATENT DOCUMENTS

CN 303873322 9/2016
CN 201830226523 9/2018
(Continued)

OTHER PUBLICATIONS

4YoreElves Mermaid Candy Bracelet Kit, posted Nov. 22, 2024 [online], [retrieved from internet, https://www.amazon.com/4YoreElves-Mermaid-Bracelet-String-Jewelry/BODJCH2H26/ref=cm_cr_arp_d_product_top? (Year 2024), 9 pages.
(Continued)

*Primary Examiner* — Marisa V Conlon
(74) *Attorney, Agent, or Firm* — Christensen, Fonder, Dardi & Busse PLLC; Timothy J. Busse; Andrew H. Auderieth

(57) ABSTRACT

A dynamic pet treat device includes a spine, a body, and a retainer. The spine has a proximal portion, a distal portion, and a medial portion disposed between the proximal portion and the distal portion, the medial portion configured to receive one or more pet treats. The body extends from the proximal portion of the spine and optionally can define a shape of a prey to encourage a pet to play with the device. The retainer extends from the distal portion of the spine and is configured to retain the one or more pet treats on the spine. The retainer can optionally include a dynamic tail that further encourages the pet to play with the device.

19 Claims, 10 Drawing Sheets

(56) References Cited

U.S. PATENT DOCUMENTS

| | | | | | |
|---|---|---|---|---|---|
| 5,322,036 | A * | 6/1994 | Merino | A63H 15/04 | |
| | | | | 446/268 | |
| 5,357,904 | A * | 10/1994 | Takahashi | A01K 15/025 | |
| | | | | 428/11 | |
| 5,755,184 | A | 5/1998 | Neidenberger | | |
| 6,601,539 | B1 | 8/2003 | Snook | | |
| 6,688,258 | B1 * | 2/2004 | Kolesar | A01K 5/0114 | |
| | | | | 119/710 | |
| D638,178 | S | 5/2011 | Byrne | | |
| D831,297 | S | 10/2018 | Kreamer | | |
| D842,557 | S | 3/2019 | Gardner | | |
| 10,271,519 | B2 * | 4/2019 | Pennington | B65H 75/42 | |
| D930,284 | S | 9/2021 | Buckner | | |
| D1,010,272 | S | 1/2024 | Potter | | |
| D1,019,021 | S | 3/2024 | Chen | | |
| D1,036,055 | S | 7/2024 | Potter | | |
| 2003/0136352 | A1 | 7/2003 | Lazarich | | |
| 2004/0082263 | A1 | 4/2004 | Parrish | | |
| 2005/0066911 | A1 | 3/2005 | Lubeck | | |
| 2005/0284410 | A1 * | 12/2005 | Brown-Smith | A01K 15/025 | |
| | | | | 119/707 | |
| 2007/0101923 | A1 | 5/2007 | Pedersen | | |
| 2008/0072828 | A1 | 3/2008 | Beck | | |
| 2009/0056641 | A1 | 3/2009 | Freeman | | |
| 2013/0092097 | A1 | 4/2013 | Cooper | | |
| 2013/0192536 | A1 | 8/2013 | Lohmann | | |
| 2014/0209037 | A1 | 7/2014 | Kirschbaum | | |
| 2014/0274480 | A1 | 9/2014 | Chandless | | |
| 2015/0101548 | A1 | 4/2015 | Amos | | |
| 2015/0257364 | A1 | 9/2015 | Renforth | | |
| 2023/0284656 | A1 | 9/2023 | Potter | | |
| 2025/0064021 | A1 | 2/2025 | Van Wert | | |

FOREIGN PATENT DOCUMENTS

| | | |
|---|---|---|
| CN | 201830575199.X | 3/2019 |
| CN | 201930435881.3 | 2/2020 |
| CN | 307572944 | 9/2022 |
| CN | 202430065899.X | 11/2024 |
| DE | 402011002169.2 | 11/2013 |

OTHER PUBLICATIONS

Froot Loops & Licorice Candy Necklace Tutorial—YouTube, posted Aug. 29, 2014 [online], [retrieved Sep. 8, 2025], retrieved from internet, https://www.youtube.com/watch?v=yZSnVDi_1e0 (Year 2014), 2 pages.

Purrsuits™M 4-in-1 Play & Treat Pack, posted Aug. 12, 2005 [online], [retrieved Sep. 8, 2025], retrieved from internet, ttps://youtube.com/watch?v=yf90f15hCys (Year 2025), 3 pages.

Our Cat Reacts to the New Friskies Playfuls—YouTube, posted Dec. 29, 2023 [online], [retrieved Sep. 8, 2025], retrieved from internet, https://www.youtube.com/watch?v=ooq8iFbENw0, (Year 2023), 2 pages.

Giddy Kitty, Date No Available [online], [retrieved Aug. 15, 2025], retrieved from internet, https://giddykitty.com/ (Year 2025), 12 pages.

Bead Hole too Small for Cord? Beading Hacks: How to Thread Beads on Thick Cord!—YouTube, posted Apr. 1, 2023, see 2:45/3:03 [online}, [retrieved Aug. 15, 2025], retrieved from URL:<https://www.youtube.com/watch?v=d-jNmAScxOQ>, 4 pages.

* cited by examiner

DYNAMIC PET TREAT SYSTEM

CROSS REFERENCE TO RELATED APPLICATION

This patent application claims the benefit of U.S. Provisional Application No. 63/534,654, filed Aug. 25, 2023, the entire contents of which is expressly incorporated by reference herein.

FIELD OF THE DISCLOSURE

This invention relates to dynamic pet treat devices, as well as apparatuses and systems incorporating dynamic pet treat devices, and method of manufacturing dynamic pet treat devices.

BACKGROUND

Pets need stimulation for their mental and physical wellbeing. Hunting, playing, socializing, and exploring lead to many health benefits such as, for example, physical exercise (reduces or prevents obesity and health issues like diabetes or the like), brain development, mental stimulation, emotional satisfaction (creating happiness and wellbeing), and reduced stress and cortisol levels.

SUMMARY

Some pets may benefit from play that simulates hunting. For example, when hunting, cats or other hunting animals may stalk a prey, chase or pounce on the prey, capture the prey, and eat the prey. Dynamic pet treat systems that simulate hunting by allowing a pet to stalk, pounce, capture, and eat may provide more mental and physical stimulus compared to pet toys that do not include all facets of actual hunting, such as eating. In other words, playtime that includes provision of treats provides a closed loop to complete the needs and includes all facets of the natural hunt experience. Additionally, playtime that includes provision of treats may foster connections between humans and pets to build trust, learn boundaries and reduce destructive behaviors like aggressiveness, fighting, inappropriate pouncing on feet, biting, or the like.

In some examples, the disclosure describes a dynamic pet treat device that includes a cord having a proximal portion, a distal portion, and a medial portion disposed between the proximal portion and the distal portion; one or more pet treats disposed on the medial portion of the cord; and at least one retainer configured to retain the pet treats on the cord.

In some examples, the disclosure describes a dynamic pet treat device that includes a spine, a body, and a retainer. The spine has a proximal portion, a distal portion, and a medial portion disposed between the proximal portion and the distal portion. The medial portion is configured to receive one or more pet treats. The body extends from the proximal portion of the spine. The retainer extends from the distal portion of the spine and is configured to retain the one or more pet treats on the spine.

In some examples, the disclosure describes a dynamic pet treat apparatus that includes a dynamic pet treat device and a wand having an elongate body terminating in a distal end configured to couple to the dynamic pet treat device. The dynamic pet treat device includes a cord having a proximal portion, a distal portion, and a medial portion disposed between the proximal portion and the distal portion; one or more pet treats disposed on the medial portion of the cord; and at least one retainer configured to retain the pet treats on the cord.

In some examples, the disclosure describes a dynamic pet treat apparatus that includes a dynamic pet treat device and a wand. The dynamic pet treat device includes a spine having a proximal portion, a distal portion, and a medial portion disposed between the proximal portion and the distal portion, the medial portion is configured to receive one or more pet treats; a body extending from the proximal portion of the spine; and a retainer extending from the distal portion of the spine, the retainer configured to retain the one or more pet treats on the spine. The wand includes an elongate body terminating in a distal end configured to couple to the dynamic pet treat device.

In some examples, the disclosure describes a dynamic pet treat system includes at least one dynamic pet treat apparatus; a foot; a pillar extending from a proximal end coupled to the foot to a distal end; a mount coupled to the distal end of the pillar. A dynamic pet treat apparatus includes a dynamic pet treat device and a wand having an elongate body terminating in a distal end configured to couple to the dynamic pet treat device. The dynamic pet treat device includes a cord having a proximal portion, a distal portion, and a medial portion disposed between the proximal portion and the distal portion; one or more pet treats disposed on the medial portion of the cord; and at least one retainer configured to retain the pet treats on the cord. The mount is configured to couple to a proximal end of the wand of the at least one dynamic pet treat apparatus.

In some examples, the disclosure describes a method the manufacturing a dynamic pet treat device that includes positioning a core of a spine within a mold body; overmolding the core with a polymeric material to form the spine, the spine including a proximal portion, a distal portion, and a medial portion disposed between the proximal portion and the distal portion, the medial portion is configured to receive one or more pet treats; molding a body extending from the proximal portion of the spine; and molding a retainer extending from the distal portion of the spine, the retainer configured to retain the one or more pet treats on the spine.

DETAILED DESCRIPTION

Figure 1:
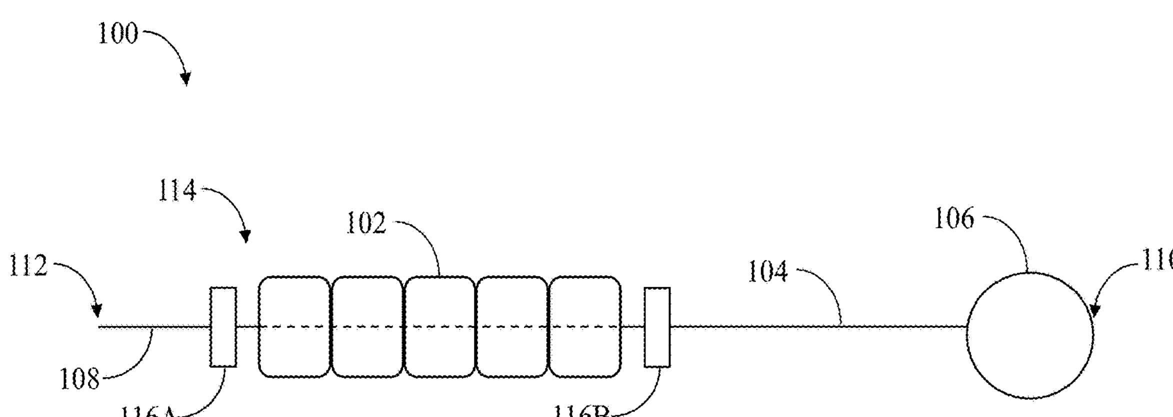
FIG. 1 is a conceptual diagram illustrating an example dynamic pet treat device.

For purposes of promoting an understanding of the principles of the disclosure, reference will now be made to the embodiments illustrated in the drawings, and specific language will be used to describe the same. It will nonetheless be understood that no limitation of the scope of the disclosure is intended by the illustration and description of certain embodiments of the disclosure. In addition, any alterations and/or modifications of the illustrated and/or described embodiment(s) are contemplated as being within the scope of the present disclosure. Further, any other applications of the principles of the disclosure, as illustrated and/or described herein, as would normally occur to one skilled in the art to which the disclosure pertains, are contemplated as being within the scope of the present disclosure.

The present disclosure describes dynamic pet treat systems that can be used as one or more of a treat retainer, a play toy, and/or a feeding device. Although described herein with respect to cats, the dynamic pet treat systems may be used with any type of domestic pets, non-domestic pets, zoo animals, or livestock, such as, for example, birds, cats, dogs, horses, rabbits, reptiles, rodents, wild cats, giraffes, bears, or the like. Additionally, the dimensions of components of the dynamic pet treat device, apparatus, and system are described relative to domestic cats, however, for larger animals, the dimensions of the components described herein may be scaled, for example, two-times or more, such as five-times, the described dimensions. By simulating hunting behaviors including stalking, pouncing, capturing, and eating, the described dynamic pet treat systems improve mental and physical stimulus compared to pet toys that do not include all facets of actual hunting, such as eating.

FIG. 1 is a conceptual diagram illustrating an example dynamic pet treat device 100. In some examples, a dynamic pet treat device 100 (hereinafter, device 100) may include a grouping of pet treats 102 strung onto length of cord 104. The grouping of pet treats 102 may include any number of treats, such as one treat, two treats, five treats, ten treats, or more. Cord 104 may extend from a proximal portion 110 to a distal portion 112. A medial portion 114 of cord 104 is disposed between proximal portion 110 and distal portion 112.

Proximal portion 110 of cord 104 may define a structure, such as loop 106, that is configured to engage an object. For example, loop 106 may be grasped by the hand of an owner or coupled to a movable or fixed object. In some examples, proximal portion 110 of cord 104 may be configured to mechanically couple to a head unit of device 100. For example, proximal portion 110 may include a mechanical fastener such as a threaded rod, clip, or the like that is configured to removably mechanically couple proximal portion 110 to the head unit. The head unit may include one or more features to enhance engagement of a pet with device 100, such as, for example, a replica rodent head or bust.

Distal portion 112 of cord 104 may define a structure, such as dynamic tail 108, that is configured to move freely in response to engagement. For example, dynamic tail 108 may freely swing when contacted by a paw of a cat, similar to a rodent tail, to entice the cat to interact with device 100. Dynamic tail 108 may be any suitable length, such as within a range from about 1-inch to about 12-inches, within a range from about 2-inches to about 6-inches, or about 2.5-inches. In some examples, dynamic tail 108 may include one or more features to enhance engagement of a pet with device 100, such as, for example, a replica rodent tail, feathers, or the like.

A medial portion 114 of cord 104 is configured to retain treats 102 with one or more treat retaining structures, i.e., retainers. For example, medial portion 114 includes distal retainer 116A and proximal retainer 116B (collectively, retainers 116). Although illustrated as including two retainers, in some examples, device 100 may include only a distal retainer or no retainers. Retainers 116 are configured to prevent treats 102 from moving past retainers 116, thereby retaining treats 102 on cord 104 until treats 102 are broken or otherwise removed by the cat.

In some examples, retainers 116 may include knots formed by a portion of cord 104. In other examples, retainers 116 may include an annular cylindrical, a punched spherical, or torus (i.e., donut) shaped structure defining an aperture having an inner diameter configured to receive therethrough at least a portion of cord 104 in a friction fit engagement. In yet other examples, retainers 116 may include clips or other removable devices configured to releasably engage a selected portion of cord 104. In some examples, removably mechanically coupled head unit or dynamic tail may function as retainers 116.

Cord 104 may include any suitable composition, such as one or more natural, non-toxic, food safe, and/or digestible materials. In some examples, cord 104 may include one or more of cotton, hemp, jute, sisal, linen, silicon, paper, latex, braided sweet grass, braided plants, braided catnip stems, braided wheat straw, collagen casing, or combinations thereof. In some examples, cord 104 may include metal components such as a rod, one or more wires, or the like. In some examples, cord 104 may include an overmolding material, such as, for example, a silicon overmolding.

In some examples, cord 104 may include a stretchable cord, e.g., an elastic cord, a cord including blend of cotton and silicon rubber threads, or the like. Cord 104 including a stretch cord may provide a dynamic moving mechanism. For example, in response to a pulling force, cord 104 may be configured to recoil via an elastic force toward its original length. Additionally, or alternatively, cord 104 may include a slip knot or mechanical spring to enable dynamic movement via an elastic or spring force. Additionally, or alternatively, cord 104 may include a spring coil or other shape configured to provide a dynamic moving mechanism.

The dynamic movement enabled by cord 104 may urge the cat to pounce device 100 and learn to capture device 100 so that treats 102 can be eaten. For example, cord 104 may stretch and snap out of the grasp of the cat's mouth, paw, or claws such that capturing treats 102 serves as mental stimulation and physical exercise for the cat. In this way, device 100 is configured to facilitate behaviors such as stalking, pouncing, and capturing before eating.

Treats 102 may include any suitable dry or semi-solid treat having sufficient structure to remain coupled to cord 104 until a cat bites or otherwise breaks a respective treat from cord 104. For example, treats 102 may include dry treats defining an annular cylinder, a punched sphere, or a torus shape. In some examples, treats 102 may include treats similar to Purina Playful treats available from Nestle Purina PetCare, St. Louis, Missouri. In other examples, treats 102 may be substantially pliable such that cord 104 may be threaded through a treat 102, for example, using a needle shaped tool to push or pull cord 104 through treat 102. In yet other examples, treats 102 may be formed on cord 104 by, for example, positioning a semisolid treat material on cord 104 followed by at least one or more of baking, freezing, or drying the semisolid treat material on cord 104. In some examples, the composition of treats 102 may enable treats 102 to be formed on cord 104.

In some examples, device 100 can be simply placed on the ground for the cat to work at eating treats 102 by biting and removing treats 120 from cord 104. Additionally, or alternatively, device 100 may be dangled from loop 106 by an owner to entice the cat.

In other examples, device 100 may be modular, such that device 100 may be configured to integrate with or be coupled to static or moveable objects or systems. For example, device 100 may be hung by loop 106 from a static object, including but not limited to, a door handle, a wall hook, a banister, or the like. Alternatively, device 100 could be fixed to a movable object.

Figure 2:
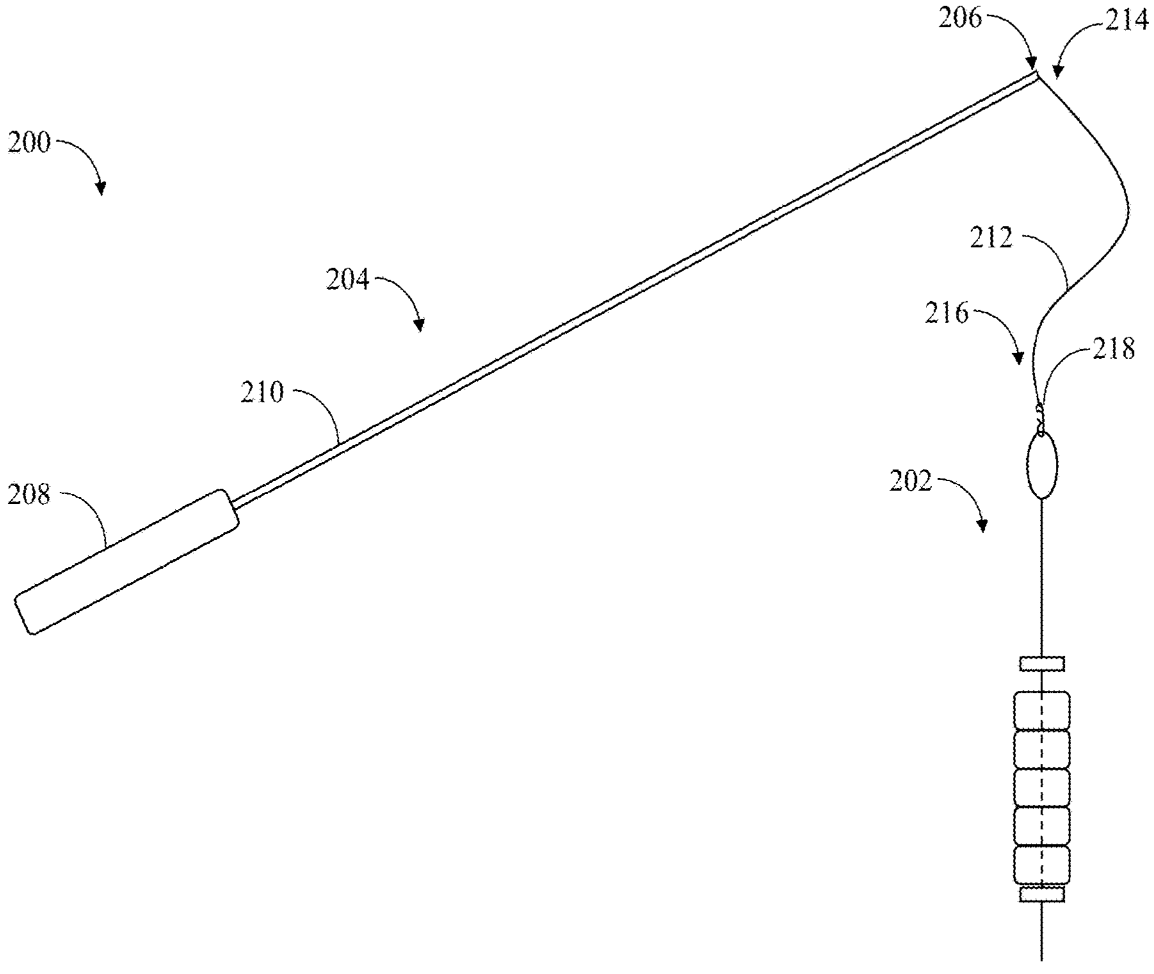
FIG. 2 is a conceptual diagram illustrating a dynamic pet treat apparatus.

FIG. 2 is a conceptual diagram illustrating a dynamic pet treat apparatus 200 (hereinafter, apparatus 200). Apparatus 200 includes a dynamic pet treat device 202 (hereinafter, device 202) attached to an end 206 of a wand 204. Device 202 may be the same as or substantially similar to device 100 discussed above, except for the differences described herein. Wand 204 may include a proximal handle 208 configured to be grasped by a hand of a user and an elongate body 210 extending from handle 208 to a distal end 206.

In some examples, device 202 may be coupled to wand 204. For example, distal end 206 may include a feature configured to engage a loop of device 202 (e.g., loop 106). In other example, apparatus 200 may include a cord 212 configured to couple wand 204 to device 202. Cord 212 may be substantially similar to cord 104 described above in reference to FIG. 1. For example, cord 212 may include any suitable composition, such as one or more natural, non-toxic, food safe, and/or digestible materials; may include one or more of cotton, hemp, jute, sisal, linen, silicon, paper, latex, or combinations thereof; and/or may include a stretchable cord.

As illustrated in FIG. 2, cord 212 is coupled to distal end 206 of wand 204. For example, a proximal end 214 of cord 212 may be tied to or mechanically fixed to distal end 206 of wand 204. In some examples, cord 212 may terminate in a distal end 216 that is tied to or mechanically fixed to a coupler 218. Coupler 218 may include, for example, a swivel, a clip, a hook, a ring, or another mechanical device configured to removably couple two cords. In other examples, distal end 216 of cord 212 may be tied to device 202. By removably coupling device 202 to wand 204, a user may remove a device 202 once the cat has eaten the treats (e.g., treats 102) and place a new device 202 onto wand 204. In this way, apparatus 200 may enable quick changing of treats to maintain engagement of a cat during play, to change types of treats, or to dispose of old treats that were not eaten during play.

Figure 3:
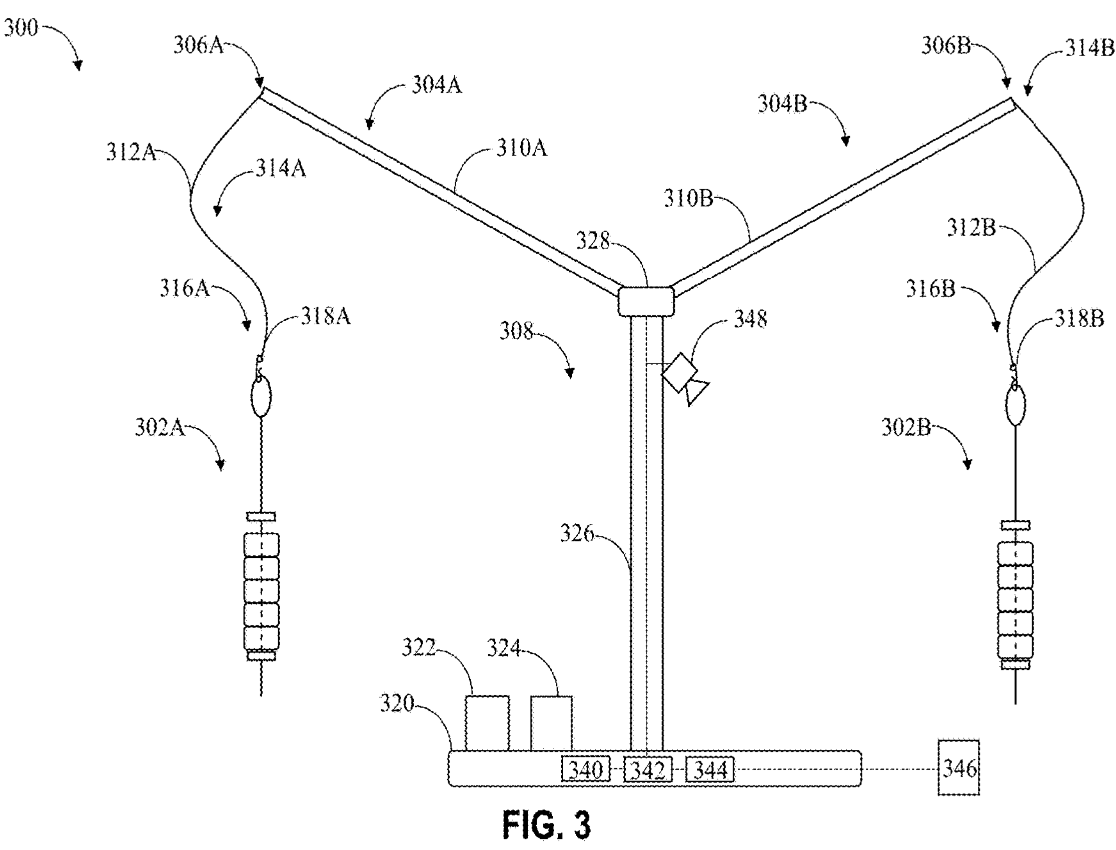
FIG. 3 is a conceptual diagram illustrating a dynamic pet treat system.

FIG. 3 is a conceptual diagram illustrating a dynamic pet treat system 300 (hereinafter, system 300). System 300 includes a plurality of dynamic pet treat devices 302A and 302B (collectively, devices 302) coupled to respective wands 304A and 304B (collectively, wands 304) that are coupled to a base structure 308 (hereinafter, base 308). Although illustrated as including two wands 304, in some examples, system 300 may include a single wand or more than two wands, such as three wands, four wands, five wands, ten wands, or more, each coupled to a respective device. Devices 302 may be the same as or substantially similar to device 100 and/or device 202 discussed above, except for the differences described herein.

Wands 304 may be the same as or substantially similar to wand 204 discussed above, except for the differences described herein. For example, wands 304 may include respective elongate bodies 310A and 310B (collectively, elongate bodies 310) extending from a mount 328 to a respective distal end 306A and 306B (collectively, distal ends 306). Distal ends 306 include a feature configured to engage a loop of device 302 (e.g., loop 106) or a respective cord 312A and 312B (collectively, cords 312) that are configured to couple wands 304 to respective devices 302. Cords 312 may be substantially similar to cord 104 described above in reference to FIG. 1. For example, cord 312 may include any suitable composition, such as one or more natural, non-toxic, food safe, and/or digestible materials; may include one or more of cotton, hemp, jute, sisal, linen, silicon, paper, latex, or combinations thereof; and/or may include a stretchable cord. In some examples, cord 312 may include other materials, such as monofilament line, braided line, rope, string, or the like.

In some examples, respective proximal ends of cords 312 may be tied to or mechanically fixed to distal ends 306 of respective wands 304. In other examples, respective proximal ends of cords 312 may be coupled to a mechanical device configured to retract respective cords 312. For example, cords 312 may be coupled to a respective reel and electric motor configured to rotate the reel to retract or extend the respective cords 312. In this way, system 300 may be configured to control any length of cord 312 that is extended from wands 304. In some examples, the one or more electric motors and reels may be mounted within or on any suitable component of system 300, such as, for example, mount 328, pillar 326, or foot 320, which are described in further detail below.

In some examples, wands 304 and/or distal ends 306 of wand 304 may be configured to conceal device 302 when in a retracted position, for example, by retracting device 302 into an aperture defined by a respective distal end 306 of wands 304 or retracting devices past a distal edge of a barrier, a dome, or a fabric extending from and/or between wands 304. In this way, system 300 may resemble an umbrella shaped structure.

In at least these ways, system 300 may be configured to retract devices 302, e.g., out of reach of a cat, during non-play times, and deploy devices 302 during play times. The retraction or deployment of devices 302, as further discussed below, may be controlled based on time of day, motion detection, near field communication, or the like.

Cord 312 terminates in respective distal ends 316A and 316B (collectively, distal ends 316) that are tied to or otherwise mechanically fixed to a respective coupler 318A and 318B (collectively, couplers 318). Couplers 318 may be the same as or substantially similar to couplers 218 discussed above in reference to FIG. 2.

Base 308 includes a foot 320, a pillar 326, and mount 328. Foot 320 is shaped to provide stability to system 300. For example, foot 320 may have dimensions (e.g., length and width) selected to prevent or reduce system 300 from tipping over when a cat engages or otherwise pulls on one or more devices 302. Additionally, or alternatively, foot 320 may be weighted to prevent or reduce system 300 from tipping over when a cat engages or otherwise pulls on one or more devices 302. Foot 320 may include any suitable material, such as wood, metal, or plastic. In some examples, foot 320 may be covered with one or more materials such as a fabric, twine, silicon, or the like.

In some examples, foot 320 may be configured to retain and/or organize pet related items. For example, foot 320 may define one or more surface recesses configured to receive and retain therein a food dish 322 and/or a water dish 324. In this way, a pet may associate system 300 with a feeding station. In other examples, foot 320 may similarly be configured to receive and/or retain food bins, pet toy containers, pet medication containers, pet collars, pet leashes, or the like.

In some examples, foot 320 defines one or more optional internal compartments or channels configured to receive therein one or more electronics wires or electronic devices.

Pillar 326 is coupled to, and extends upward from, foot 320. For example, a proximal end of pillar 326 may be coupled to foot 320 by one or more mechanical fasteners such as screw, bolts, or nails. In other examples, foot 320 may define an interface configured to receive in a secured (e.g., locking) configuration at least a base portion of pillar 326. For example, pillar 326 and foot 320 may snap fit or the like.

Pillar 326 is shaped to retain wands 304 a selected distance from ground level and/or foot 320. Pillar 326 may have any suitable dimensions (e.g., length, width, and or height). In some examples, a height of pillar 326 may be within a range from about 12-inches to about 48-inches, such as about 24-inches. Pillar 326 may include any suitable material, such as wood, metal, or plastic. Pillar 326 may be covered with one or more materials such as a fabric, twine, silicon, or the like.

In some examples, pillar 326 defines one or more optional internal channels, e.g., extending through a center of pillar 326, through which one or more electronics wires may be run or within which one or more electronic devices may be housed.

Mount 328 is coupled to a distal end of pillar 326. Mount 328 may be coupled to pillar 326 by one or more mechanical fasteners such as screw, bolts, or nails. In other examples, pillar 326 may define an interface configured to receive in a secured (e.g., locking) configuration at least a base portion of mount 328. For example, pillar 326 and mount 328 may snap fit or the like.

Mount 328 defines one or more apertures configured to receive therein proximal ends of respective wands 304. Mount 328 may be rotatable relative to pillar 326 and/or base 320. For example, mount 328 may be coupled to distal end of pillar 326 via at least one bearing such as mount 328 may freely rotate relative to pillar 326. In other examples, mount 328 may include one or more bearings internal to mount 328 such that a first portion of mount 328 is non-rotatably fixed to pillar 326 and a second portion of mount 328 is rotatable relative to the first portion of mount 328.

In some examples, mount 328 may include one or more electric motors configured to rotate mount 328 relative to base 320 and/or pillar 326. In some examples, a speed of rotation of mount 328 may be selectable by a user. In this way, system 300 may be configured to rotate devices 302 during play times to entice a cat to interact with devices 302. The rotation of mount 328, as further discussed below, may be controlled based on time of day, motion detection, near field communication, or the like. Although described herein as mount 328 being optionally rotatable, in some examples, pillar 326 may be rotatable as described herein.

As illustrated in FIG. 3, system 300 optionally includes powered electronics, imaging, and/or communications devices. For example, system 300 may include a power source 340, processing circuitry 342, communications circuitry 344, and camera 348.

Power source 340 may include a battery or interface to receive power from an external power source. Power source 340 may be coupled to processing circuitry 342 and other optional electronic devices, such as the optional electric motors configured to control rotation of mount 328 and/or retraction of cords 312 as discussed above.

Processing circuitry 342 may include one or more computing devices configured to control an operation of the communications circuitry 344, camera 348, or other optional electronic devices (e.g., the optional electric motors). Processing circuitry 342 may be housed within system 300 or dispersed among devices within system 300 and outside of system 300, such as a smart phone, a tablet, a laptop, a desktop, a cloud-based computing device, or the like.

Communications circuitry 344 may include one or more devices configured to communicatively couple processing circuitry 342, camera 348, or other optional electronic devices (e.g., the optional electric motors) to one or more external devices 346. For example, communication circuitry 344 may be configured to transmit or receive data from external device 346 to control a function of processing circuitry 342, camera 348, or other optional electronic devices (e.g., the optional electric motors). External devices 346 may include, for example, one or more of a smart phone, a tablet, a laptop, a desktop, a cloud-based computing device, or the like. In this way, one or more external devices 346 may be configured to operate as a remote control to control an operation of system 300.

In some examples, communications circuitry 344 may be configured to operate using near field communications with an external device 346 associated with a cat. For example, a collar of the cat may include a chip configured for near field communications, such as an RFID tag or the like. In this way, system 300 may be configured to perform an operation based on proximity of the cat to system 300. For example, system 300 may be configured to deploy devices 302 when system 300 detects, via communications circuitry 344, the cat is within a selected distance from system 300.

Camera 348 may include a digital camera, a motion sensor, an infrared camera, or other imaging or optics devices. Additionally, or alternatively, camera 348 may include a microphone and/or a speaker for detection and/or provision of sound or other audio data. In some examples, system 300 may be configured to deploy devices 302 when system 300 detects, via camera 348, motion or thermal signature of the cat approaching system 300. In some examples, camera 348 may be communicatively coupled, via communications circuitry 344, to an external device, such as a smart phone, to enable a user to view when or how a cat is eating, playing, or otherwise provide live or recorded updates of interaction of the cat with system 300. Such interaction may be enabled by a dedicated application on the smart phone of the user, which may provide a direct link to system 300 for additional security of audio or video information. This communication may help to ensure the health of the cat, provide information of which cat of a plurality of cats is interacting with system 300 (e.g., how much food an individual cat is consuming), and/or serves as a form of interaction between the user and the cat when the user is away at work or on vacation. In some examples, live or recorded updates could be initiated based on motion sensors or snapshots of recorded videos of the cat eating and playing. In some examples, live or recorded updates may help to reduce or prevent overeating and obesity in cats.

Figure 4:
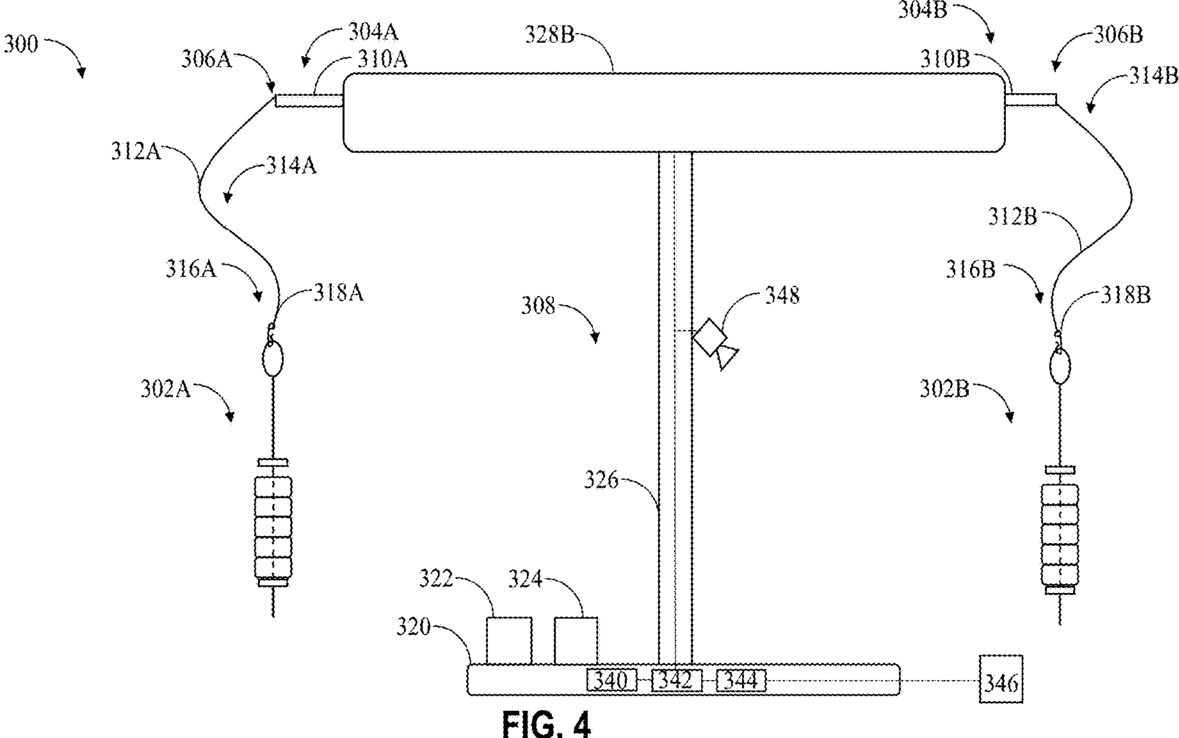
FIG. 4 is a conceptual diagram illustrating a dynamic pet treat system.

FIG. 4 is a conceptual diagram illustrating a dynamic pet treat system 300B. System 300B may be the same or substantially similar to system 300 described above in reference to FIG. 3, except for the differences described herein. For example, system 300B includes a dome 328B. In some examples, dome 328B may include a mount, such as mount 328 described above. In other examples, dome 328B may include barrier or a fabric extending from and/or between wands 304. For example, dome 328B of system 300 may resemble an umbrella shaped structure. In this way, system 300B may be configured to conceal devices 302 when in a retracted position, for example, by retracting device 302 into an aperture defined by a respective distal end 306 of wands 304 or retracting devices past a distal edge dome 328B.

Figure 5:
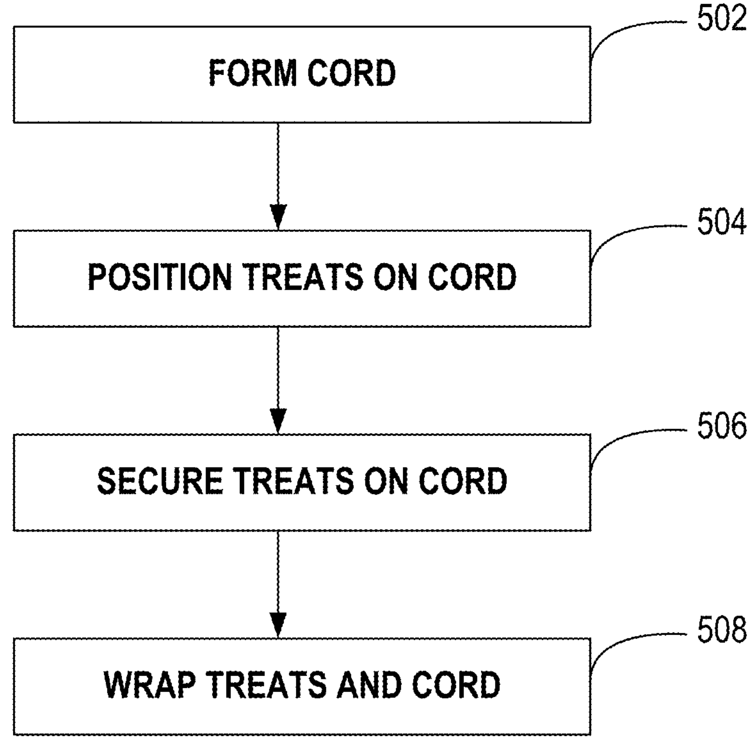
FIG. 5 is a flow diagram illustrating an example technique of manufacturing and packaging a dynamic treat device.
Figures 6A, 6B:
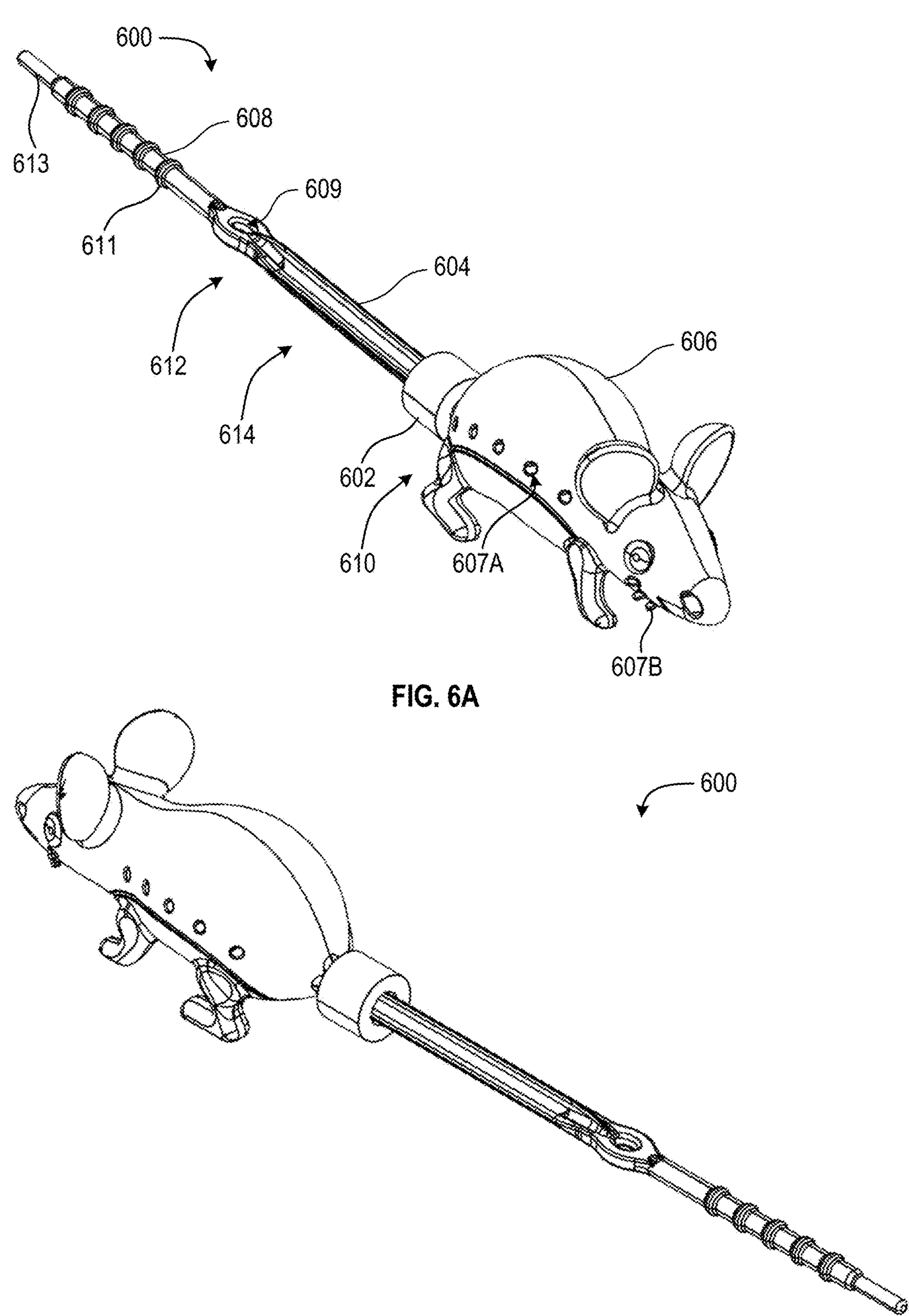
FIGS. 6A through 6I are conceptual diagrams illustrating various views of a dynamic pet treat device.
Figure 6C:
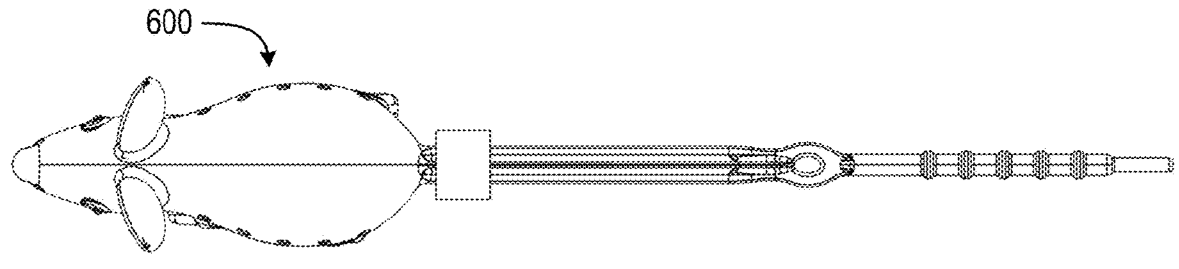
Figure 6D:
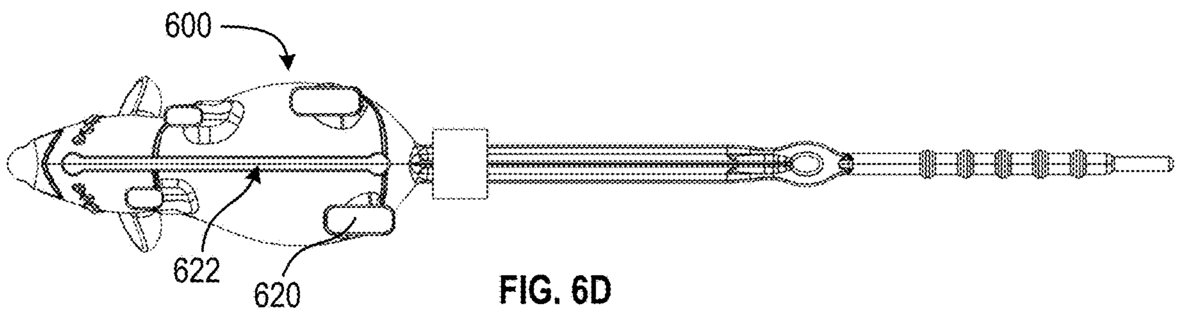
Figure 6E:
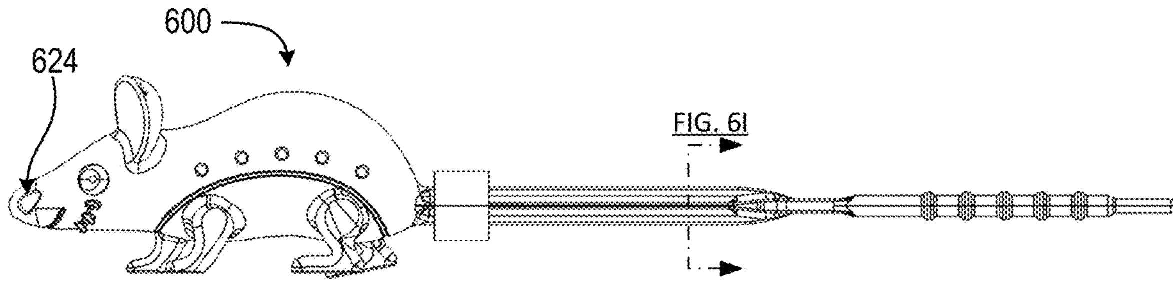
Figure 6F:
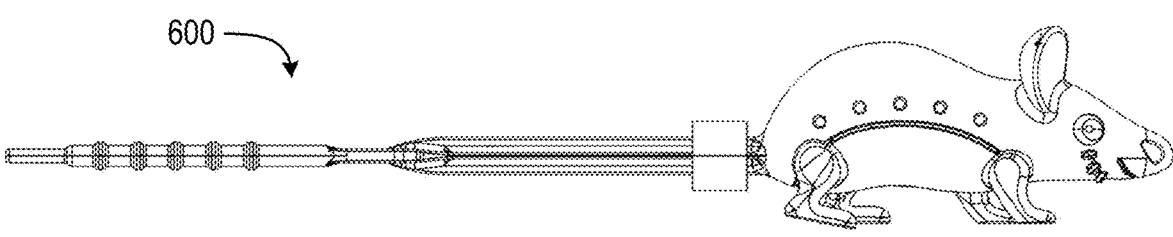
Figure 6G:
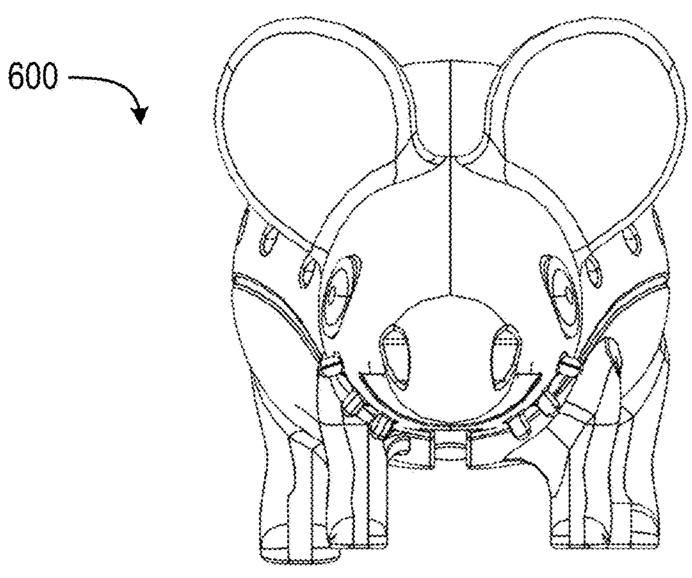
Figure 6H:
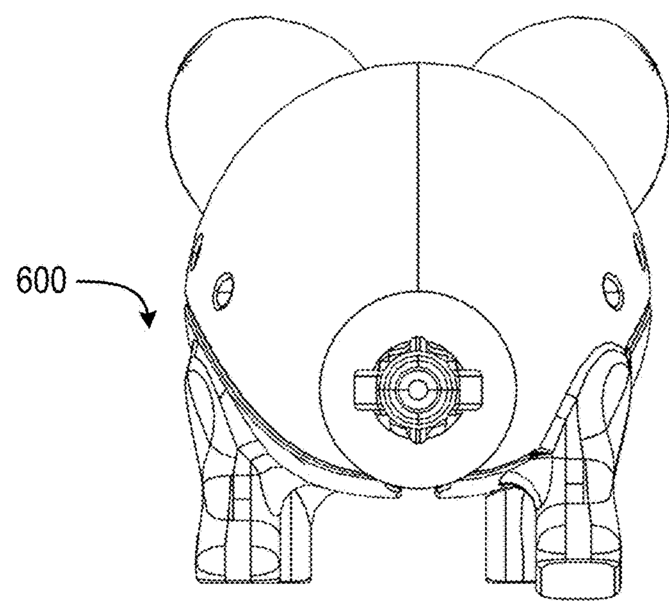
Figure 6I:
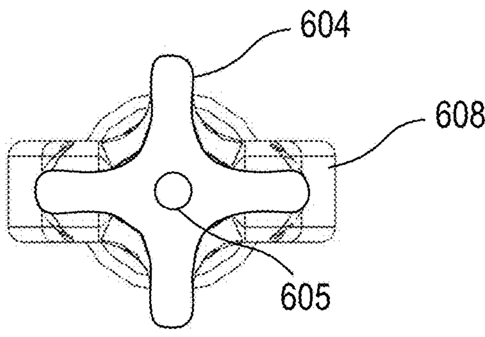
Figure 7A:
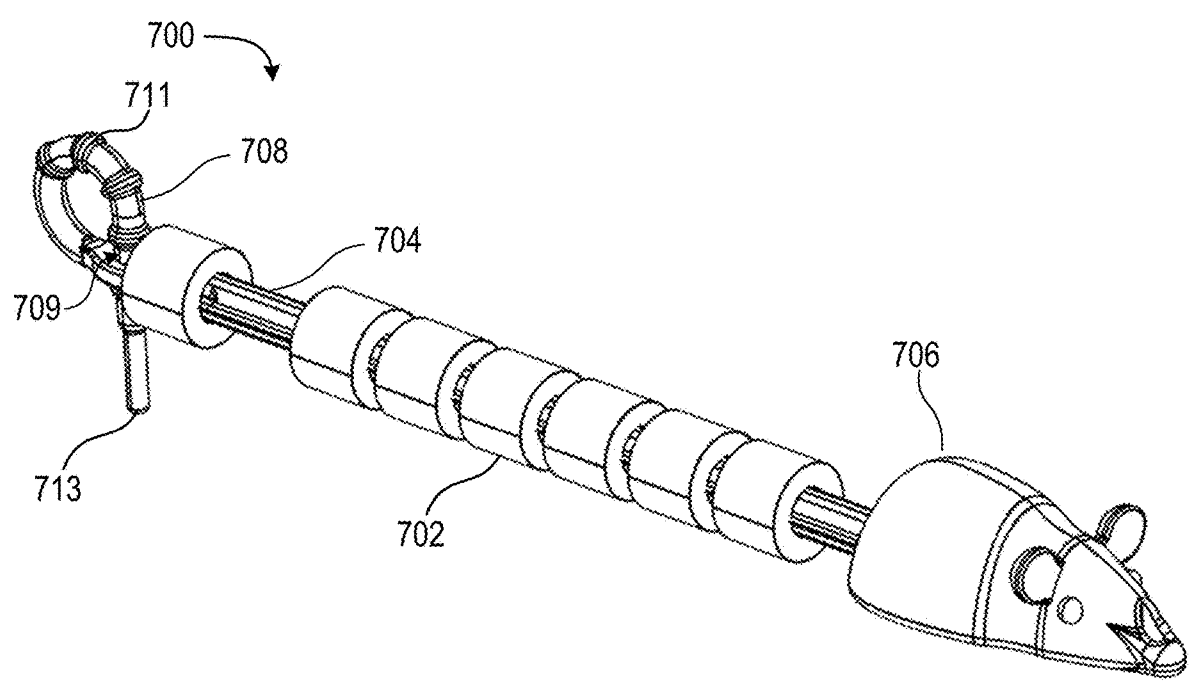
FIGS. 7A through 7H are conceptual diagrams illustrating various views of a dynamic pet treat device.
Figure 7B:
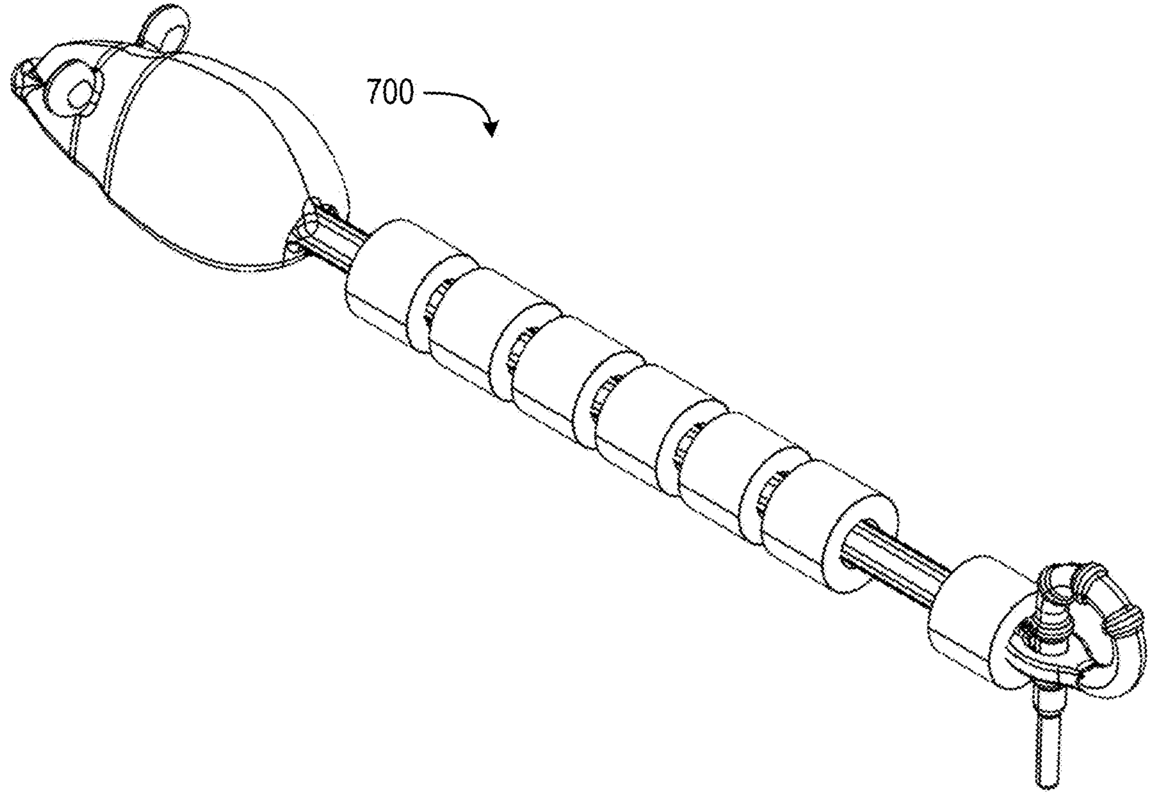
Figure 7C:
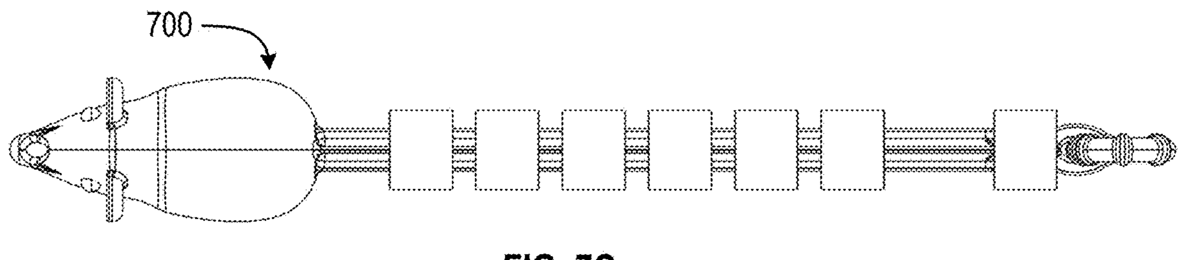
Figure 7D:
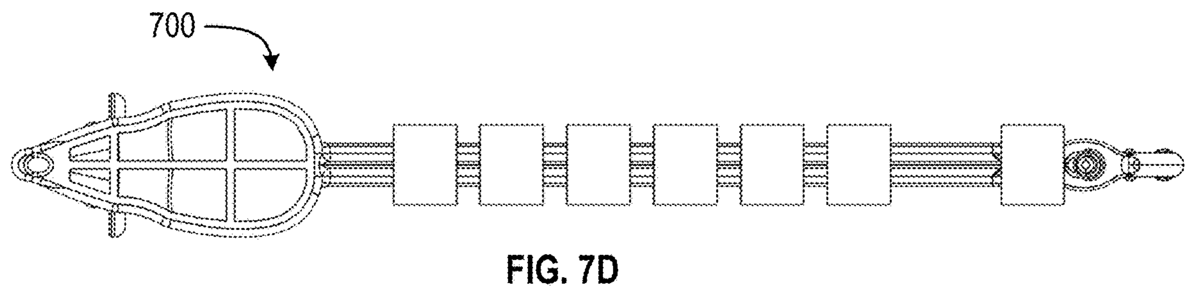
Figure 7E:
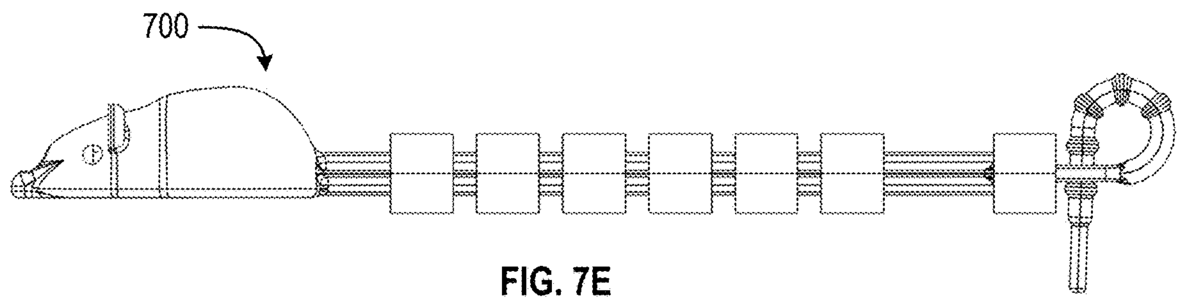
Figure 7F:
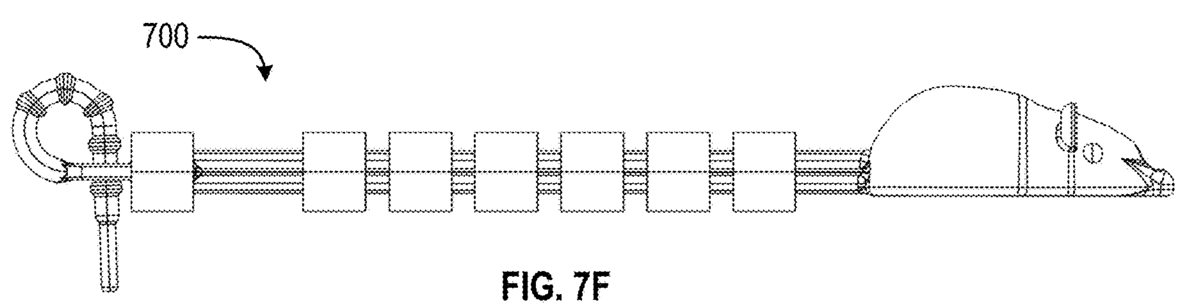
Figure 7G:
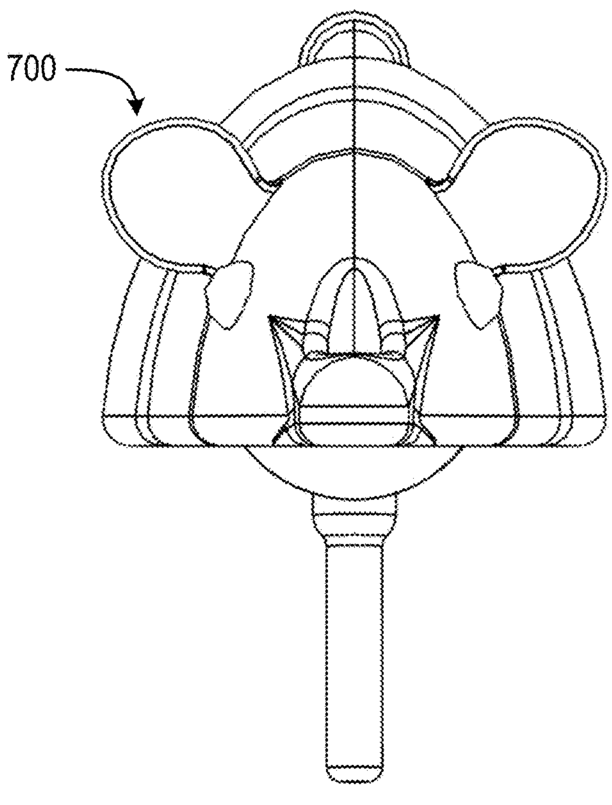
Figure 7H:
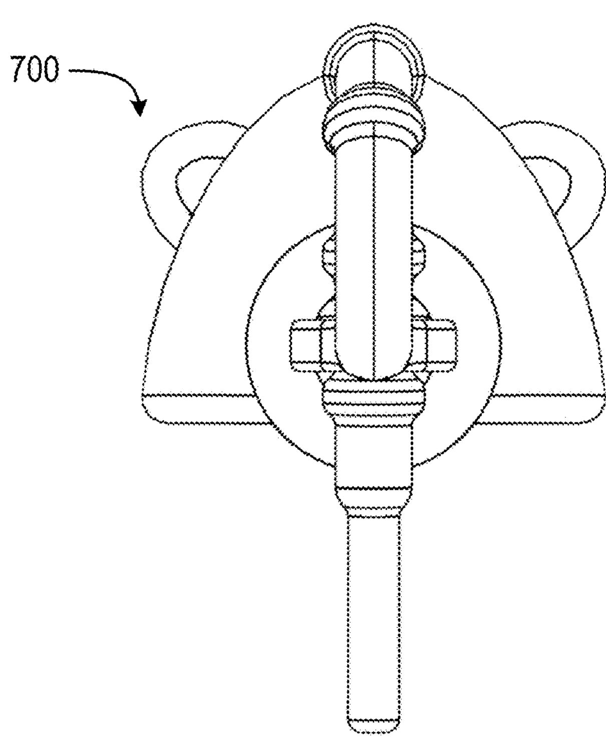

The dynamic treat devices, apparatuses, and systems described herein may be manufactured using any suitable techniques. FIG. 5 is a flow diagram illustrating an example technique of manufacturing and packaging a dynamic treat device. Although the technique of FIG. 5 is described in reference to device 100 illustrated in FIG. 1, the technique may be used to form other devices, and device 100 may be formed using other techniques.

The technique illustrated in FIG. 5 includes forming cord 104 (502). Forming cord 104 may include cutting to length a cord from a reel or bundle of cord. In some examples, forming cord 104 may include creating loop 106. In some examples, forming cord 104 may include forming a coating on or otherwise providing a treatment to cord 104.

The technique illustrated in FIG. 5 also includes positioning treats 102 on cord 104 (504). In some examples, positioning treats 102 on cord 104 may include stringing cord 104 through an aperture defined by individual treats 102. Optionally, the technique may include using a needle shaped tool coupled to cord 104 to push or pull cord 104 through treat 102 (e.g., either with or without an aperture). In other examples, the technique may include forming treats 102 on cord 104 by, for example, positioning a semisolid treat material on cord 104 followed by at least one or more of baking, freezing, or drying the semisolid treat material on cord 104.

The technique illustrated in FIG. 5 includes securing treats 102 on cord 104 (506). In some examples, securing treats 102 on cord 104 may include forming a knot in at least a portion of cord 104. Additionally, or alternatively, securing treats 102 on cord 104 may include positioning retainers 116 on cord adjacent at least one end of treats 102. For example, retainers 116 may be strung onto cord 104 similar to stringing treats 102 onto cord 104. In some examples, the technique may include positioning one or more retainers 116 on cord prior to positioning treats 102 on cord 104.

The technique illustrated in FIG. 5 includes optionally wrapping treats 102 and at least a portion of cord 104 (506). Wrapping treats 102 and at least a portion of cord 104 may include at least one part of a packaging process. The wrapper may include any suitable material or combination of material, such as, for example, one or more of a metal foil, a paper, a waxed paper, a plastic, a shrink wrap, a cellophane, a food safe wrap material, or the like. In some examples, the technique may include positioning cord 104 to facilitate opening of the wrapper. For example, proximal portion of cord 104 may be positioned adjacent to treats 102 extending from a proximal end of treats 102 toward a distal end of treats. At least a portion of the proximal end of cord 104 may protrude from the wrapper such that the proximal end of cord 104 may be grasped by a user and pulled such that cord 104 tears through and opens at least a portion of the wrapper. In this way, the packaging technique may enable easier opening of the wrapper relative to a packaging technique that does not position cord 104 to facilitate opening of wrapper. In some examples, a distal portion of cord 104 may be similarly positioned to facilitate opening of the wrapper.

In some examples, the technique also may include positioning a plurality of wrapped treats 102 in a grouping and packaging the grouping.

FIGS. 6A through 6I are conceptual diagrams illustrating an examples dynamic pet treat device 600 (hereinafter, device 600). Device 600 may be the same as or substantially similar to device 100 described above in reference to FIG. 1, except for the differences described herein.

Device 600 includes a spine 604 configured to receive one or more pet treats 602, such as a grouping of pet treats. Spine 604 may extend from a proximal portion 610 to a distal portion 612. A medial portion 614 of spine 604 is disposed between proximal portion 610 and distal portion 612. A body 606 extends from proximal portion 610 of spine 604. A retainer 608 extends from distal portion 612 of spine 604.

In some examples, spine 604, body 606, and retainer 608 may define a unitary assembly. In other examples, spine 604, body 606, and retainer 608 may define two or more separate, couplable components of the same or different materials. For example, spine 604 may be removably attachable to body 606 and/or retainer 608.

Spine 604, body 606, and retainer 608 may be formed of one or more materials, including, but not limited to, polymers such as silicon, polyethylene, polypropylene, rubber, or latex; natural materials such as cotton, hemp, jute, sisal, linen, silicon, paper, braided sweet grass, braided plants, braided catnip stems, braided wheat straw, or collagen casing; or combinations thereof. In some examples, the material of spine 604, body 606, and/or retainer 608 may include pigments or other additives.

In some examples, spine 604 includes a core 605 and a polymeric material overmolded on core 605. Core 605 may include a rigid or semi-rigid polymer or a flexible metal or polymeric wire. Example materials of core 605 may include, but are not limited to, nylon, polyvinylchloride, polyetherimide, polyamideimide, polyetheretherketone, steel, and nitinol. Generally, core 605 may include a material that is more resistant to breakage by chewing or other abrasive actions compared to a material of spine 604 to reduce or prevent bifurcation of spine 604 during play. In this way, device 600 may be more robust compared to a spine 604 without a core 605.

In some examples, an axial cross-section of spine 604 defines an X-shape configured to engage treats 602 in a friction fit. For example, radially outer edges of the X-shape may engage radially inner surfaces of annulus or torus shaped treats 602 in a friction fit. In this way, the shape of spine 604 may be configured to facilitate retention of one or more treats 602. Additionally, or alternatively, the X-shaped cross-section may have curved radially inner corners to reduce or prevent build-up of debris relative to angular corners and, thereby, facilitate cleaning of device 600. In other examples, spine 604 may include additional or alternative features to retain treats 602 including, for example, radially extending bristles.

Body 606 is shaped as prey to engage a pet. For example, a shape of body 606 defines a replica or a bust of at least one of a rodent (e.g., a mouse, a rat, a squirrel, or other rodent), a rabbit, a bird, a reptile (e.g., a lizard), a fish, a crustacean, or an insect. In other examples, body 606 may define other shapes, such as, for example, geometric shapes.

In some examples, body 606 may include one or more features configured to contact and clean teeth of a pet or otherwise facilitate cleaning of the teeth of a pet. For example, body 606 may define apertures 607A or protrusions 607B (e.g., bristles) shaped to sweep along teeth of a pet during play or chewing, thereby facilitating cleaning of the teeth. In this way, device 600 may be configured to both engage a pet in play and benefit oral hygiene.

In some examples, body 606 may include one or more features 620 configured to removably secure device 600 to a surface. For example, body 606 may define a suction cup configured to removably secure the body to a smooth, flat surface. Additionally, or alternatively, body 606 may define a smooth, flat surface configured to receive an adhesive patch to which a hook or other mechanical fastener may be secured. In this way, device 600 may be hung from static or movable objects or systems.

In some examples, body 606 may define a cavity 622 configured to receive therein at least one of a pet treat, a weight, a magnet, or an electronic device. Cavity 622 may be defined by an interior of body 606 with an opening as a slit or aperture. A pet treat retained in cavity 622 may facilitate play and chewing. In some examples, the pet treat may include loose or compressed catnip. A weight may provide additional stimulation during play or provide resistance from movement during play. A magnet may facilitate securement of device 600 to a ferromagnetic surface. An electronic device may include a device configured to monitor interaction of a pet with device 600 or a device configured to enhance stimulation of the pet during play, such as, for example, a vibratory motor or an electronic motor operably coupled to one or more moving appendages or other features of body 606.

In some examples, at least a portion of body 606 defines an aperture 624 having an inner diameter configured to receive therethrough at least a distal portion of retainer 608 in a friction fit engagement. For example, a nose feature of body 606 may include aperture 624. In this way, spine 604, body 606, and retainer 608 may form a circular or ring-like structure retaining one or more treats 602.

Retainer 608 is configured to retain the one or more pet treats on spine 604. For example, retainer 608 defines an aperture 609 and one or more bulbous portions 611. Aperture 609 is proximal to one or more bulbous portions 611. Aperture 609 is configured to receive therethrough and engage at least one of one or more bulbous portions 611 to retain the pet treats on spine 604. Additionally, or alternatively, aperture 609 may include an inner diameter configured to receive therethrough at least a distal portion of retainer 608 in a friction fit engagement. In other example, retainer may be configured to receive a clip to retain the pet treats on spine 604.

In some examples, retainer 608 defines a dynamic tail. The dynamic tail may be more easily moveable or flexible compared to spine 604, which may enhance pet stimulation or otherwise better facilitate play compared to a device 600 without a dynamic tail.

FIGS. 7A through 7H are conceptual diagrams illustrating an examples dynamic pet treat device 700 (hereinafter, device 700). Device 700 may be the same as or substantially similar to device 600 described above in reference to FIGS. 6A through 6I, except for the differences described herein. For example, device 600, device 700 includes a spine 704 configured to receive one or more pet treats 702, such as a grouping of pet treats. Spine 704 may extend from a proximal portion 710 along a medial portion 714 to a distal portion 712. A body 706 extends from proximal portion 710 of spine 704. A retainer 708 extends from distal portion 712 of spine 704. In some examples, spine 704, body 706, and retainer 708 may define a unitary silicon assembly. In other examples, spine 704, body 706, and retainer 708 may define two or more separate, couplable components of the same or different materials.

Figure 8:
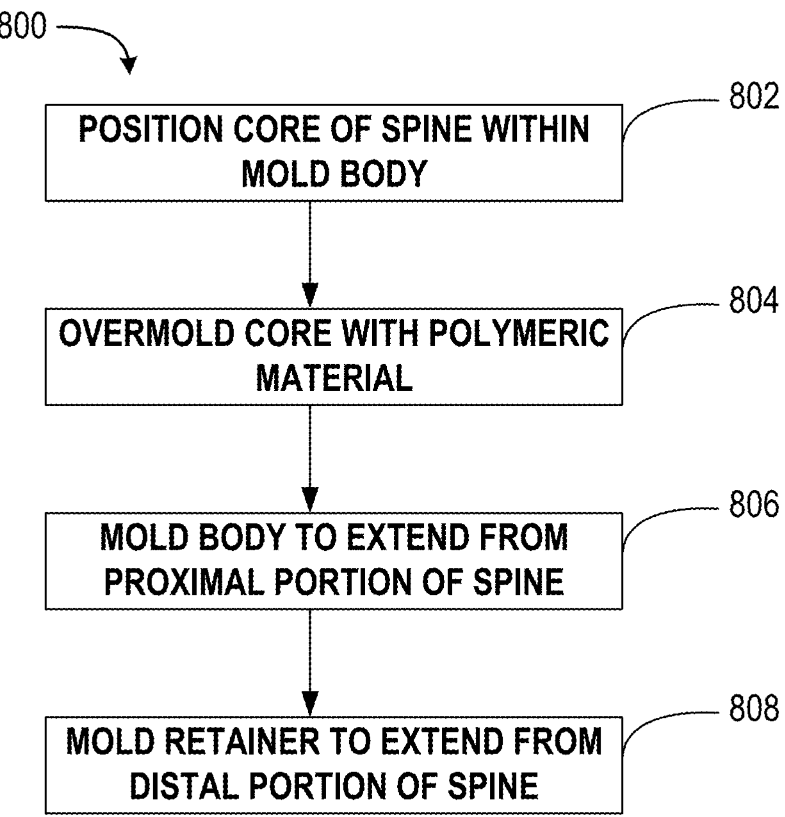
FIG. 8 is a flow diagram illustrating an example technique of forming a dynamic pet treat device.

FIG. 8 is a flow diagram illustrating an example technique 800 of forming a dynamic pet treat device, such as device 600 and/or 700. Although technique 800 is described in reference to device 600, technique 800 may be used for form other devices. Additionally, other techniques may be used to form device 600.

Technique 800 includes positioning core 605 of spine 604 within a mold body (802). The mold body may define the shape of device 600 inclusive of spine 604, body 606, and retainers 608. Alternatively, a first mold may define the shape of at least spine 604 and additional molds, e.g., a second mold and an optional third mold, may define the shape of one or both of body 606 and retainer 608.

Technique 800 also includes overmolding core 605 with a polymeric material to form spine 604 (804). The polymeric material may include a silicon based material or other materials described herein.

Technique 800 also includes molding body 606 to extend from proximal portion 610 of spine 604 (806). For example, at least distal portion of body 606 may be overmolded onto at least a portion of proximal portion 610. Alternatively, body 606 may be formed together with spine 604 in a single mold when overmolding core 605.

Technique 800 also includes molding retainer 608 to extend from distal portion 612 of spine 604. For example, at least a proximal portion of retainer 608 may be overmolded onto at least a portion of distal portion 612. Alternatively, retainer 608 may be formed together with spine 604 in a single mold when overmolding core 605.

In other examples, body 606, retainer 608, or both may be separately formed, for example, by molding, and subsequently coupled to spine 604. Such coupling may be performed using an adhesive, ultrasonic welding, thermal welding, mechanical fastening, or other suitable techniques.

The following clauses illustrate example subject matter described herein.

Clause 1. A dynamic pet treat device comprising: a cord comprising a proximal portion, a distal portion, and a medial portion disposed between the proximal portion and the distal portion; one or more pet treats disposed on the medial portion of the cord; and at least one retainer configured to retain the pet treats on the cord.

Clause 2. The dynamic pet treat device of clause 1, wherein the proximal portion of the cord defines a loop.

Clause 3. The dynamic pet treat device of clause 1, wherein the distal portion of the cord defines a dynamic tail.

Clause 4. The dynamic pet treat device of clause 1, wherein the at least one retainer comprises a knot defined by at least a portion of the cord.

Clause 5. The dynamic pet treat device of clause 1, wherein the at least one retainer comprises a structure defining an aperture having an inner diameter configured to receive therethrough at least a portion of the cord in a friction fit engagement.

Clause 6. The dynamic pet treat device of clause 1, wherein the at least one retainer comprises a clip.

Clause 7. The dynamic pet treat device of clause 1, wherein the cord comprises one or more of cotton, hemp, jute, sisal, linen, silicon, paper, latex, or combinations thereof.

Clause 8. The dynamic pet treat device of clause 1, wherein the cord comprises a stretchable cord.

Clause 9. The dynamic pet treat device of clause 1, wherein the cord comprises blend of cotton and silicon rubber threads.

Clause 10. The dynamic pet treat device of clause 1, wherein each of the one or more pet treats define an aperture configured to receive therethrough at least a portion of the cord.

Clause 11. The dynamic pet treat device of clause 1, wherein the one or more treats comprise a composition configured to be formed on the cord.

Clause 12. A dynamic pet treat apparatus, comprising: the dynamic pet treat device of any one of clauses 1 through 11;

and a wand comprising an elongate body terminating in a distal end configured to couple to the dynamic pet treat device.

Clause 13. The dynamic pet treat apparatus of clause 12, wherein the wand further comprises a proximal handle, wherein the elongate body extends from the proximal handle.

Clause 14. The dynamic pet treat apparatus of clause 12, further comprising a second cord coupled to the distal end of the elongate body, wherein the second cord is coupled to the proximal portion of the dynamic pet treat device.

Clause 15. The dynamic pet treat apparatus of clause 14, further comprising a coupler coupled to a distal end of the second cord, wherein the coupler is configured to removably couple second cord to the proximal portion of the dynamic pet treat device.

Clause 16. A dynamic pet treat system, comprising: at least one dynamic pet treat apparatus of any one of clauses 12 through 15; a foot; a pillar extending from a proximal end coupled to the foot to a distal end; a mount coupled to the distal end of the pillar, wherein the mount is configured to couple to a proximal end of the wand of the at least one dynamic pet treat apparatus.

Clause 17. The dynamic pet treat system of clause 16, further comprising: at least one reel operably coupled to the second cord of the dynamic pet treat apparatus; and at least one electric motor coupled to the at least one reel, wherein the at least one motor is configured to rotate the at least one reel to retract or deploy the dynamic pet treat device from the at least one dynamic pet treat apparatus.

Clause 18. The dynamic pet treat system of clause 16, wherein the foot defines one or more recesses configured to receive therein at least one of a food dish, a water dish, a food bin, a pet toy container, a pet medication container, a pet collar, and a pet leash.

Clause 19. The dynamic pet treat system of clause 16, wherein the foot is configured to receive the pillar in a snap-fit configuration.

Clause 20. The dynamic pet treat system of clause 16, wherein the pillar defines one or more internal channels configured to receive therethrough one or more electronics wires.

Clause 21. The dynamic pet treat system of clause 16, wherein the mount is configured to rotate relative to the pillar.

Clause 22. The dynamic pet treat system of clause 21, further comprising an electronic motor, wherein the electronic motor is configured to rotate the mount.

Clause 23. The dynamic pet treat system of clause 16, further comprising: a power source; processing circuitry operably coupled to the power source, wherein the processing circuitry is configured to control an operation of one or more electronic devices of the dynamic pet treat system; and communications circuitry operable coupled to the processing circuitry, wherein the communications circuitry is configured to communicatively coupled the processing circuitry to one or more external devices.

Clause 24. The dynamic pet treat system of clause 23, further comprising a camera operatively coupled to the power source and the processing circuitry, wherein the processing circuitry is configured to control an operation of the camera.

Clause 25. The dynamic pet treat system of clause 23, further comprising a microphone operatively coupled to the power source and the processing circuitry, wherein the processing circuitry is configured to control an operation of the microphone.

Clause 26. The dynamic pet treat system of clause 24 or 25, wherein the processing circuitry is configured to transmit, via the communication circuitry, to the one or more external devices a video data received from the camera or an audio data received from the microphone.

Clause 27. A method of making a dynamic pet treat device, comprising: forming a cord; positioning pet treats on the cord; and securing the pet treats on the cord.

Clause 28. The method of clause 27, further comprising wrapping the pet treats and at least a portion of the cord with a wrapper, wherein the cord is positioned within the wrapper to facilitate opening of the wrapper.

Clause 29. The method of clause 27, wherein forming the cord comprises cutting the cord to length, forming a loop in the cord, or providing a treatment to the cord.

Clause 30. The method of clause 27, wherein positioning the treats on the cord comprises stringing the cord through an aperture defined by the treats, using a needle shaped tool to push or pull the cord through the treats, or forming the treats on the cord by positioning a semisolid treat material on the cord followed by at least one or more of baking, freezing, or drying the semisolid treat material on the cord.

Clause 31. The method of clause 27, wherein securing treats on the cord comprises forming a knot in at least a portion of the cord, positioning one or more retainers on the cord.

Clause 32. The method of clause 27, further comprising positioning a plurality of wrapped treats in a grouping and packaging the grouping.

While the disclosure has been described in connection with what is presently considered to be the most practical and preferred embodiments, it is to be understood that the disclosure is not to be limited to the disclosed embodiments, but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore, it should be understood that while the use of the word preferable, preferably, or preferred in the description above indicates that feature so described may be more desirable, it nonetheless may not be necessary and any embodiment lacking the same may be contemplated as within the scope of the disclosure, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A dynamic pet treat device, comprising:

a spine extending longitudinally from a proximal portion to a distal portion, and comprising a medial portion disposed between the proximal portion and the distal portion, wherein the medial portion is configured to receive one or more pet treats;

a body extending proximally from the proximal portion of the spine; and a retainer extending distally from the distal portion of the spine, the retainer defining an aperture and extending longitudinally from the aperture to a distal tip, wherein the retainer comprises a bulbous portion extending in a radial direction and disposed between the aperture and the distal tip, wherein the retainer is configured to bend so that the distal tip extends through the aperture, and wherein the aperture is configured to receive therethrough at least the distal tip of the retainer and engage the bulbous portion to retain the one or more pet treats on the spine when the retainer is bent.

2. The dynamic pet treat device of claim 1, wherein a shape of the body defines a replica of at least one of a rodent, a rabbit, a bird, a reptile, a fish, a crustacean, and an insect.

3. The dynamic pet treat device of claim 1, wherein the retainer defines a dynamic tail.

4. The dynamic pet treat device of claim 1, wherein the aperture is configured to receive the bulbous portion in a friction fit engagement.

5. The dynamic pet treat device of claim 1, further comprising the one or more pet treats, wherein the one or more pet treats comprises one or more edible pet treats, wherein each edible pet treat defines an annular cylinder or a torus having an aperture sized to receive the medial portion therethrough.

6. The dynamic pet treat device of claim 1, wherein the spine comprises a core and a polymeric material overmolded on the core.

7. The dynamic pet treat device of claim 1, wherein an axial cross section of the spine defines an X-shape configured to engage the one or more pet treats in a friction fit.

8. The dynamic pet treat device of claim 1, wherein the spine, the body, and the retainer comprise unitary assembly.

9. The dynamic pet treat device of claim 1, wherein the body defines a plurality of features configured to contact and clean teeth of a pet.

10. The dynamic pet treat device of claim 1, wherein body defines a cavity configured to receive therein at least one of a pet treat, a weight, a magnet, and an electronic device.

11. The dynamic pet treat device of claim 1, wherein the body defines at least one of a suction cup configured to removably secure the body to a smooth, flat surface and a surface configured to receive an adhesive patch.

12. The dynamic pet treat device of claim 1, wherein the body defines an aperture having an inner diameter configured to receive therethrough at least a distal portion of the retainer in a friction fit engagement.

13. The dynamic pet treat device of claim 1, wherein the spine is removably attachable to the body.

14. A dynamic pet treat apparatus, comprising:

a dynamic pet treat device, comprising:

a spine extending longitudinally from a proximal portion to a distal portion, and comprising a medial portion disposed between the proximal portion and the distal portion, wherein the medial portion is configured to receive one or more pet treats;

a body extending proximally from the proximal portion of the spine; and a retainer extending distally from the distal portion of the spine, the retainer defining an aperture and extending longitudinally from the aperture to a distal tip, wherein the retainer comprises a bulbous portion extending in a radial direction and disposed between the aperture and the distal tip, wherein the retainer is configured to bend so that the distal tip extends through the aperture, and wherein the aperture is configured to receive therethrough at least the distal tip of the retainer and engage the bulbous portion to retain the one or more pet treats on the spine when the retainer is bent; and a wand comprising an elongate body terminating in a distal end configured to couple to the dynamic pet treat device.

15. The dynamic pet treat apparatus of claim 14, wherein the wand further comprises a proximal handle, and wherein the elongate body extends from the proximal handle.

16. The dynamic pet treat apparatus of claim 14, further comprising a cord coupled to the distal end of the elongate body, wherein the cord is coupled to at least one of the body or the retainer of the dynamic pet treat device.

17. The dynamic pet treat apparatus of claim 16, further comprising a coupler coupled to a distal end of the cord, wherein the coupler is configured to removably couple the cord to at least one of the body or the retainer of the dynamic pet treat device.

18. A method the manufacturing the dynamic pet treat device of claim 1, wherein the method comprises:

positioning a core of a spine within a mold body;

overmolding the core with a polymeric material to form the spine, wherein the spine extends longitudinally from a proximal portion to a distal portion, and comprising a medial portion disposed between the proximal portion and the distal portion, wherein the medial portion is configured to receive one or more pet treats;

molding a body extending proximally from the proximal portion of the spine; and molding a retainer extending distally from the distal portion of the spine, the retainer defining an aperture and extending longitudinally from the aperture to a distal tip, wherein the retainer comprises a bulbous portion extending in a radial direction and disposed between the aperture and the distal tip, wherein the retainer is configured to bend so that the distal tip extends through the aperture, and wherein the retainer is configured to retain the one or more pet treats on the spine when the retainer is bent.

19. The method of claim 18, wherein overmolding the core comprises overmolding the core with the polymeric material to form the spine, the body, and the retainer.

* * * * *